US010019987B2

(12) United States Patent
Dides et al.

(10) Patent No.: US 10,019,987 B2
(45) Date of Patent: Jul. 10, 2018

(54) AUDIBLE PROXIMITY MESSAGING (71) Applicant: PAYPAL INC., San Jose, CA (US)

(72) Inventors: Emil Dides, San Jose, CA (US);
Shereen Kamalie, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 234 days.

(21) Appl. No.: 14/585,282

(22) Filed: Dec. 30, 2014

(65) Prior Publication Data
US 2016/0189708 A1 Jun. 30, 2016

(51) Int. Cl.
H04N 7/173 (2011.01)
H04N 7/16 (2011.01)
H04M 1/00 (2006.01)
G10L 15/08 (2006.01)
G10L 25/87 (2013.01)
G10L 15/22 (2006.01)

(52) U.S. Cl.
CPC ............. *G10L 15/08* (2013.01); *G10L 25/87* (2013.01); *G10L 2015/088* (2013.01); *G10L 2015/223* (2013.01)

(58) Field of Classification Search
CPC ..... G06Q 30/00; G06Q 30/02; H04M 1/7253; H04N 21/235; H04N 21/4126
USPC ........... 704/251, 203, 9; 705/14.58; 715/728
See application file for complete search history.

(56) References Cited

U.S. PATENT DOCUMENTS

| 6,862,713 | B1* | 3/2005 | Kraft ................ G06F 17/30646 704/246 |
| 7,197,277 | B2 | 3/2007 | Davies et al. |
| 8,090,768 | B2 | 1/2012 | Johnson et al. |
| 2005/0257242 | A1* | 11/2005 | Montgomery ....... G11B 27/034 725/116 |
| 2006/0031216 | A1* | 2/2006 | Semple ............ G06F 17/30858 |
| 2006/0212897 | A1 | 9/2006 | Li et al. |
| 2006/0287919 | A1* | 12/2006 | Rubens ............ G06F 17/30864 705/14.53 |

(Continued)

OTHER PUBLICATIONS

United States Patent and Trademark Office, as the International Searching Authority for PCT/US2015/063296, International Preliminary Report on Patentability dated Jun. 24, 2016, 10 pages.

(Continued)

*Primary Examiner* — Akwasi M Sarpong
(74) *Attorney, Agent, or Firm* — Haynes and Boone, LLP (57) ABSTRACT

Methods, systems, and computer program products for providing audible proximity messaging are disclosed. A computer-implemented method may include receiving a message for communication to one or more users, receiving a keyword associated with a message, analyzing an audio track to determine whether the keyword exists in the audio track, matching the keyword to the audio track, identifying one or more locations of the keyword in the audio track, converting the message to an audible format, determine whether to provide the message to a user based on one or more conditions associated with the user, and providing the message to a user when the keyword is played during the audio track. In some examples, the message may be an audio message played when the keyword plays in the audio track based on one or more of a user preference, a user location, a current user activity, and/or other factors.

20 Claims, 4 Drawing Sheets

(56) References Cited

U.S. PATENT DOCUMENTS

| | | | |
|---|---|---|---|
| 2007/0078708 A1* | 4/2007 | Yu | G06Q 30/02 705/14.69 |
| 2007/0124789 A1* | 5/2007 | Sachson | G06Q 30/00 725/117 |
| 2008/0082424 A1 | 4/2008 | Walton | |
| 2008/0190272 A1* | 8/2008 | Taub | G10H 1/0058 84/645 |
| 2009/0256972 A1* | 10/2009 | Ramaswamy | G06Q 30/02 348/738 |
| 2010/0121973 A1 | 5/2010 | Lobecheva et al. | |
| 2011/0287748 A1* | 11/2011 | Angel | H04M 3/42221 455/414.1 |
| 2012/0059729 A1* | 3/2012 | Roa | G06Q 30/02 705/26.1 |
| 2012/0239496 A1* | 9/2012 | Clarke-Martin | G06Q 30/02 705/14.49 |
| 2012/0290289 A1* | 11/2012 | Manera | G06F 17/2785 704/9 |
| 2012/0330769 A1 | 12/2012 | Arceo | |
| 2013/0027227 A1 | 1/2013 | Nordstrom | |
| 2013/0110565 A1* | 5/2013 | Means, Jr. | G06Q 10/06 705/7.11 |
| 2013/0210461 A1 | 8/2013 | Moldavsky et al. | |
| 2013/0231931 A1* | 9/2013 | Kulis | G06F 3/167 704/235 |
| 2013/0297422 A1* | 11/2013 | Hunter | G06Q 30/0261 705/14.58 |
| 2014/0006032 A1 | 1/2014 | Korn | |
| 2014/0122087 A1* | 5/2014 | Macho | G10L 15/22 704/275 |
| 2014/0257994 A1 | 9/2014 | Conant | |

OTHER PUBLICATIONS

United States Patent and Trademark Office as the International Searching Authority, International Search Report and Written Opinion for PCT/US15/63296, dated Feb. 12, 2016, 9 pages.

* cited by examiner

AUDIBLE PROXIMITY MESSAGING

TECHNICAL FIELD

The present disclosure generally relates to computer systems and, more particularly, to providing audible proximity messaging using computer systems.

BACKGROUND

The convergence of portable computing devices, online and streaming music services, and seemingly ubiquitous internet access allows users to access audio content from around the world in virtually any location. In addition, wearable computing devices, such as wireless headphones and wireless earbuds, provide users with added convenience and continue to grow in popularity. As such, the consumption of audio content and the importance of audio content in the lives of users will continue to increase. Therefore, new and improved ways of communicating with users through audio content is of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products are disclosed for providing audible proximity messaging in audio and other types of content.

In an example, an audible message provider receives an audible message from a source seeking to provide the message to one or more users. The message provider further receives a keyword associated with the audible message for determining where to play the audible message in audio content of a user. The audible message provider analyzes an audio track to determine whether the keyword exists in the audio track, matches the keyword to content of the audio track, and identifies one or more locations of the keyword in the audio track.

In an example, the audible message provider may convert a non-audible message, such as a textual message, to an audible format capable of being played to a user. The audible message provider determines whether to provide an audible message to a user based on one or more of user preferences, user interests, user location, user needs, a current user activity, etc. The audible message provider then plays the audible message to a user when the keyword is played during the audio track. For example, the audio message provider may blend the audible message with an original audio track at a location where the keyword occurs. The audio message provider also may replace a portion of an original audio track with a selected audio message.

Accordingly, aspects of the present disclosure provide users with audio messages of interest during playing of an audio track based on content of the audio track and factors pertaining to user interests, location, and activity.

Figure 1:
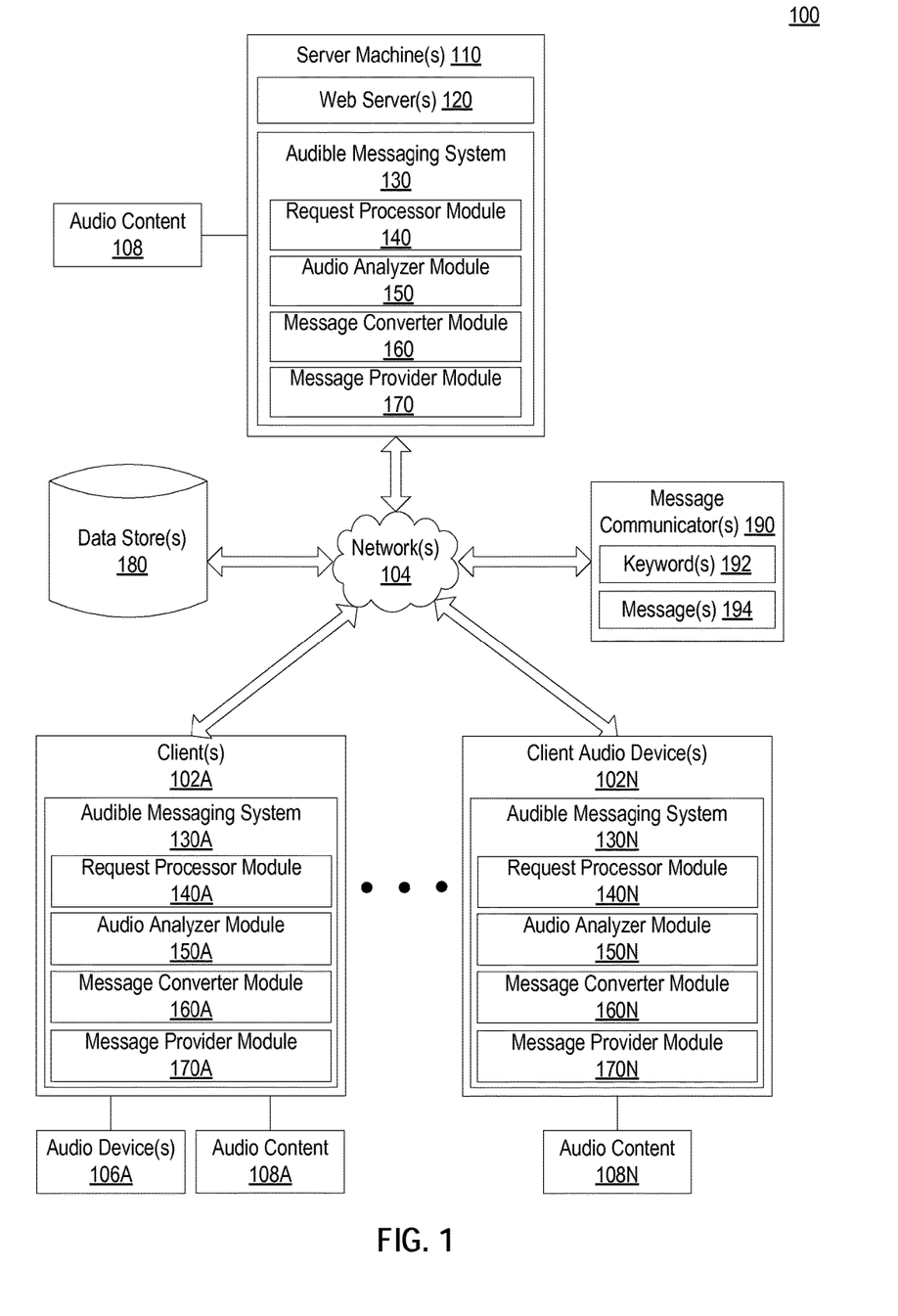
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes one or more server machine(s) 110, one or more data store(s) 180, one or more client machine(s) 102A, one or more clients audio device(s) 102N, and one or more message communicator(s) 190 connected via one or more network(s) 104.

Network(s) 104 may be public networks (e.g., the Internet), private networks (e.g., local area networks (LANs) wide area networks (WANs)), or any combination thereof. In an example, network(s) 104 may include the Internet, one or more intranets, wired networks, wireless networks, and/or other appropriate types of communication networks. In one example, network(s) 104 may comprise wireless telecommunications networks (e.g., cellular phone network) adapted to communicate with other communication networks, such as the Internet. Network(s) 104 also may include one or more short-range wireless networks or beacon networks.

A beacon generally refers to a short-range communication device having a known or fixed location. A beacon usually provides a signal that can be detected by mobile devices within a certain proximity of the beacon. Various beacon types include radio frequency (RF) beacons (e.g., Bluetooth™ low energy (BLE) beacons), infrared beacons, and radio frequency identifier (RFID) tags. For example, BLE beacons may broadcast an RF signal that includes position coordinates (e.g., latitude, longitude, altitude), which can be detected by a mobile device. In some examples, a beacon also may advertise location-based services available on a beacon network. Generally, a beacon network usually encompasses a plurality of beacons in a geographic area.

In an example, when a mobile computing device first makes contact with a beacon in a beacon network, the beacon may transmit a list of unique identifiers of other beacons in the network and other information about the beacon network to the mobile computing device. Beacon networks may be located in any geographic area including businesses (e.g., shopping malls, retail stores, restaurants, etc.), landmarks (e.g., museums, airports, parks, entertainment venues, etc.), office buildings, government buildings, schools, universities, homes, and in any other environments where short-range communication and/or location-based services may be desired.

Data store(s) 180 refers to persistent storage capable of storing various types of data, such as text, audio, video, and image content. In some examples, data store(s) 180 may include a network-attached file server, while in other examples data store(s) 180 may include other forms of persistent storage such as an object-oriented database, a relational database, and so forth.

Client machine(s) 102A may be personal computers (PC), laptops, mobile phones, tablet computers, server computers, wearable computing devices, or any other type of computing device. Client machine(s) 102A may run an operating system (OS) that manages hardware and software of the client machine(s) 102A. A browser (not shown) may run on the client machines (e.g., on the OS of the client machines). The browser may be a web browser that can access content and services provided by web server(s) 120 of server machine(s) 110. Other types of computer programs and computer scripts also may run on client machine(s) 102A.

Client machine(s) 102A may include one or more audio device(s) 106A, one or more forms or types of audio content 108A (e.g., sound recordings, video with sound, streaming media with sound, etc.), one or more instances or copies of audio content 108A tracks, and audible messaging system 130A. Audible messaging system 130A includes request processor module 140A, audio analyzer module 150A, message converter module 160A, and message provider module 170A.

In an example, an audible messaging system (e.g., audible messaging system 130) may include one or more of a request processor module 140, an audio analyzer module 150, a message converter module 160, and a message provider module 170. In some examples, functionality associated with request processor module 140, audio analyzer module 150, message converter module 160, and message provider module 170 may be combined, divided, and organized in various arrangements on one or more computing devices.

In an example, a client machine 102A is coupled to one or more audio device(s) 106A. Audio devices 106A generally refer to any computing or non-computing device capable of playing audible information (e.g., sound, music, speech, etc.) to a user. Examples of audio device(s) 106A generally may include speakers, earbuds, wired headphones, wireless headphones, sound systems, stereos, computer systems, musical instruments, self-contained audio devices, etc.).

Client machine(s) 102A may be connected to one or more audio device(s) 106A, for example, directly or wirelessly (e.g., via Bluetooth). Audio device(s) 106A may include one or more external speakers (e.g., external computer speakers, external headphones coupled to a computing device, home theater system speakers, automobile stereo speakers, etc.). Client machine(s) 102A also may include one or more internal audio device(s) 106A that are embedded in, incorporated into, or manufactured as part of a computing device (e.g., internal speakers of a television, personal computer, laptop, tablet, smartphone, smart glasses, smart headphones, smart earbuds, "smart ear" devices (also sometimes referred to as "hearable devices"), and other various types of wearable computing devices, etc.). Audio device(s) 106A also may include one or more microphones for recording and storing sound data.

Audio content 108A generally refers to any content that includes or incorporates sound. For example, audio content 108A may include sound recordings and audiovisual works that include sound. Audio content 108A also may include content that has been or that can be converted to audible content. For example, audio content 108A also may include text that has been or can be converted to sound, speech or some other form of audible content. In general, audio content 108A may be recorded, transmitted to different locations, received, stored, played, converted to different formats, etc.

Audio content 108A generally may be provided in one or more formats or types. General examples of audio content may include songs, albums, television programs, movies, airwave radio content, internet radio content, user sound or video recordings (e.g., available via a content sharing service or a social networking service), downloaded music, streaming music, downloaded video, streaming video, narration, audio books, audio magazines, text-to-speech content, high-definition content, standard definition content, encrypted content, unencrypted content, partially encrypted content, etc. In general, a specific instance or version of audio content 108A managed by a user, or played by a user, may be referred to as an "audio track." Audio tracks may be stored and played both locally or remotely by a user. A user also may play audio tracks streamed from a remote content source or other content provider.

Client audio device(s) 102N include audible messaging system 130N and audio content 108N. Client audio device(s) 102N generally refer to standalone devices capable of playing sound to a user. For example, client audio device(s) 102N may play audio and/or various multimedia tracks to a user directly without relying on another computing device of the user. For example, smart headphones or smart earbuds may play locally stored audio tracks and/or audio tracks received directly over a network 104. Other examples of client audio devices include, but are not limited to portable internet radio players, portable handheld game devices, etc. Thus, client audio device(s) 102N generally are not tethered to, coupled to, or rely on a different local computing device (e.g., a desktop computer) as a source of audio content 108N. As such, client audio device(s) 102N generally are capable of storing, accessing, and/or receiving audio content 108N on their own without assistance from other computing devices.

Message communicator(s) 190 include keyword(s) 192, and message(s) 194. Message communicators 190 generally describe one or more entities seeking to provide one or more messages to various users. For example, message communicators 190 may include one or more different users, for-profit entities, nonprofit entities, schools, universities, businesses, merchants, retailers, financial institutions, product providers, service providers, sports teams, charities, religious organizations, medical institutions, weather services, media outlets, public figures, celebrities, actors, actresses, music artists, online entities, social media outlets, politicians, local government organizations, state government organizations, federal government organizations, international government organizations, etc.

In an example, message communicators 190 seek to provide messages to a user based on one or more of an existing relationship between a message communicator 190 and the user, a likely relationship between a message communicator 190 and the user, a location of the user, an indicated interest of the user, a detected need of the user, a need indicated by the user, a detected activity of the user, an indicated activity of the user, etc. Message communicators 190 generally may send a message to one or more individuals or groups of individuals at one time or at various different times.

Keyword(s) 192 generally refers to one or more symbols, numbers, characters, words, and/or phrases that each respective message communicator 190 in a plurality of message communicators 190 wishes to associate with content (e.g., audio content 108, audio content 108A, audio content 108N). Messages 194 generally refer to one or more text, audio, and/or video messages that a respective message communicator 190 wishes to provide to users of client machines 102A and client audio devices 102N.

Server machine(s) 110 may include one or more web server(s) 120. Web server(s) 120 may provide text, audio, image, and video content from server machine(s) 110 or other sources (e.g., data store(s) 180) to client machine(s) 102A and client audio device(s) 102N. Web server(s) 120 also may provide web-based application services, business logic, and updates to client machine(s) 102A and client audio device(s) 102N. Client machine(s) 102A and client audio device(s) 102N may locate, access, and consume various forms of content and services from web server(s) 120 using applications, such as a web browser, web servers, application servers, computer programs, etc. Web server(s) 120 also may receive text, audio, video, and image content from client machine(s) 102A and client audio device(s) 102N, for example, that is saved in data store(s) 180 for preservation and/or sharing of content.

In an example, a web server 120 is coupled to one or more application servers (not shown) that provide application services, data, and/or APIs to client machine(s) 102A and client audio device(s) 102N. In one example, web server(s) 120 may provide client machine(s) 102A and client audio device(s) 102N with access to one or more application services associated with a server-based audible messaging system 130. Such functionality also may be provided, for example, as part of one or more different web applications, standalone applications, system, plug-ins, web browser extensions, and application programming interfaces (APIs). In some examples, plug-ins and extensions also may be referred to, individually or collectively, as "add-ons."

In an example, some client machine(s) 102A and client audio device(s) 102N may include applications associated with a service provided by server machine(s) 110 (e.g., audible messaging system 130) and/or content provided by server machine(s) 110 (e.g., audio content 108). For example, one or more device types (e.g., smart phones, smart televisions, tablet computers, smart headphones, smart earbuds, smart wearable devices, smart home computer systems, etc.) may use applications to access content provided by, to issue commands to server machine(s) 110, and/or to receive content from server machine(s) 110 without visiting or using web pages.

In an example, functions performed by server machine(s) 110 and/or web server(s) 120 also may be performed by the client machines 102A-102N, in whole or in part. In addition, the functionality attributed to a particular component may be performed by different or multiple components operating together. Further, server machine(s) 110 may be accessed as a service provided to other systems or devices via appropriate application programming interfaces (APIs), and thus are not limited to use with websites.

For example, client machine(s) 102A and client audio device(s) 102N each may include respective audible messaging systems 130A, 130N and/or one or more client modules of a respective audible messaging system 130A, 130N for providing audible proximity message to a user. Server machine(s) 110 also may include respective audible messaging systems 130 and/or one or more server modules of a respective audible messaging system 130.

In an example, a request processor module 140, 140A, 140N of an audible messaging system 130, 130A, 130N receives one or more keywords 192 from each of one or more message communicators 190 seeking to communicate with one or more users at a present or future time. In an example, keywords 192 refer to one or more numbers, symbols, characters, words, or phrases that a message communicator 190 uses to associate one or more messages 194 to various content available to and consumed by users. For example, keywords 192 (e.g., "blue", "dog", "food", "shoes", "jeans", "glasses", "sun", "happy", etc.) may be matched to one or more instances of literal, similar, or associated language, sound and imagery in various content, such as text, audio, image and video content.

In an example, a message communicator 190 sends a request processor module 140, 140A, 140N of an audio messaging system 130, 130A, 130N one or more keywords 192 to locate in one or more audio tracks. An audio messaging system 130, 130A, 130N then may locate keywords 192 in various audio tracks and play one or more messages associated with respective keywords 192 to a user in one or more of the audio tracks (e.g., before, during or after a keyword 192 is played in an audio track).

In an example, a request processor module 140, 140A, 140N of an audible messaging system 130A, 130N receives one or more messages 194 associated with a keyword 192 to provide to one or more different users. For example, a request processor module 140, 140A, 140N may receive one or more messages 194 associated with various keywords 192 from one or more different message communicators 190. In some examples, various audible messaging systems 130, 130A, 130N may store messages 194 and transmit messages 194 to various other audible messaging systems 130, 130A, 130N. Messages 194 may include any combination of audio, textual, image, and/or video messages.

In an example, message communicators 190 send keyword(s) 192 and one or more corresponding messages 194 together as the same time. Message communicators 190 also may send keywords 192 and associated messages 194 at different times, for example, in short succession as part of the same transaction, or across different transactions over a period of time. In one example, a message communicator 190 may send a keyword 192 to an audible messaging system 130, 130A, 130N provider to have a keyword 192 matched to one or more audio tracks available to one or more users. Message communicators also may operate their own audible messaging system (e.g., audible messaging system 130, for example, on a beacon network, Wi-Fi network, or other types of networks 104).

In an example, message communicators 190 each may provide bids on keywords 192. For example, bids may indicate an amount that message communicators 190 offer to pay an audible messaging system 130, 130A, 130N provider for sending one or more message 194 to various client machines 102A and client audio devices 102N. In some examples, keyword 192 bids provided by a plurality of message communicators 190 are used to determine which message communicator 190 message 194 is to be provided to a user (e.g., highest bidder for a keyword, overall highest revenue generator for one or more periods, etc.).

In an example, an audio analyzer module 150, 150A, 150N of an audible messaging system 130, 130A, 130N analyzes content to identify keywords 192 used in or associated with the content. For example, an audio analyzer module 150, 150A, 150N may analyze one or more sources of content (e.g., audio content, textual content, image content, video content, etc.) to determine whether an association exists between one or more keywords 192 and the content.

In an example, an audio analyzer module 150, 150A, 150N may match a keyword 192 to text, sound, imagery, data or metadata associated with one or more different types of content (e.g., based on an exact match, similar word, fuzzy search, wild card search, Soundex match, phonetic comparison, related word, synonymous word, etc.). For example, an audio analyzer module 150, 150A, 150N may locate a keyword 192 in text, lyrics, transcription data, in a sound recording (e.g., using sound and/or voice recognition), and/or using image recognition in image and video content.

In an example, an audio analyzer module 150, 150A, 150N determines whether one or more keywords 192 exist in an audio track (e.g., a song, an audio recording, a speech, music video, musical performance, etc.) by examining one or more aspects of the audio track. For example, an audio analyzer module 150, 150A, 150N may analyze data or metadata associated with an audio track to identify one or more instances of keyword 192 in an audio track.

Audio track data may include, but is not limited to, audio track words, lyrics, transcripts, sounds. Audio track metadata may include, but is not limited to, data identifying and/or describing an audio track. Audio track metadata may include a title, an artist, a description, an index of words and/or concepts are used in the audio track, a mapping between where instances of words and/or concepts are used in an audio track, and corresponding timing information or location information about where specific keyword 192 matches occur in a track.

In an example, an audio analyzer module 150, 150A, 150N matches keyword(s) 192 to at least one part of an audio track. For example, an audio analyzer module 150, 150A, 150N may search audio track text and/or sound of an audio track (e.g., using speech or sound recognition) to find exact, similar, fuzzy, wild card, Soundex, phonetic, related, and/or synonymous keyword 192 matches within the audio track.

In an example, an audio analyzer module 150, 150A, 150N identifies one or more locations where a keyword 192 match is found in an audio track. For example, audio analyzer module 150, 150A, 150N may identify locations based on timing of where the keyword 192 match occurs in an audio track, such as one or more of audio track ID, a start time, a duration, and an end time of the keyword match (e.g., audio track three of six, start time at minute two (2:00) of audio track three, duration of three seconds (0:03), end time at minute two and three seconds (2:03) of audio track three).

An audio analyzer module 150, 150A, 150N also may identify locations based on position of characters, words, phrases, sentences, paragraphs, and pages in relation to other characters, words, phrases, sentences, paragraphs and pages. (e.g., word 8 of sentence 3 of paragraph 2, on page 1). Such location information may be expressed and represented in various ways so as to identify a keyword 192 match present in an audio track. Further, an audio analyzer module 150, 150A, 150N may keep a count of various keyword 192 matches and other related statistics, for example, to provide to message communicator(s) 190 or to perform valuation of various available audio tracks based on keywords sought for use by message communicators 190.

In an example, a message converter module 160, 160A, 160N of an audible messaging system 130, 130A, 130N performs one or more different conversions involving message communicator 190 messages 194. For example, a message converter module 160, 160A, 160N may convert a message 194 between different formats, such as from text to sound, from sound to text, between languages, between different versions of content formats (e.g., text formats, audio formats, image formats, video formats), etc.

In some examples, a message converter module 160, 160A, 160 performs conversions involving one or more messages 194 prior to when a message 194 is played to a user (e.g., before content is presented to a user, before an audio track is played to a user). A message converter module 160, 160A, 160 also may perform conversions involving one or more messages 194 near or at a time when the message is played to the user (e.g., when content is being presented to a user, when an audio track is being played to a user). For example, message conversions may be performed in real-time or substantially in real-time (e.g., under a second, within one tenth of a second, within one hundredth of a second, etc.).

In an example, a message provider module 170, 170A, 170N of an audible messaging system 130, 130A, 130N provides one or more messages 194 from at least one message communicator 190 to a user when a keyword 192 match exists in an audio track. For example, a message provider module 170, 170A, 170N may blend an audio message 194 with content of an audio track at a location corresponding to a keyword 192 match as the audio track is played to a user.

A message provider module 170, 170A, 170N, for example, also may replace sound of the audio track when the audio message 194 plays during the audio track at a location corresponding to a keyword 192 match. In addition, a message provider module 170, 170A, 170N may play an audio message 194, for example, prior to or after a location of a keyword 192 match in an audio track. Thus, an audio message 194 generally may be played in relation to a location where a keyword 192 match occurs and is not limited to being played at an exact location or time of a keyword 192 match.

In an example, a message provider module 170, 170A, 170N provides audio messages 194 to a user based on information provided by a message communicator 190. For example, a message communicator 190 may indicate when to play audio messages 194 in an audio track (e.g., based on an artist or other individual in the audio track, based on an author of the audio track, based on a source of the audio track, based on a provider of the audio track, and/or based on various other aspects of the audio track), where to play audio messages 194 in an audio track (e.g., the first instance, the third instance, the final instance, during the first verse, during the second verse, during the final verse, during a chorus, during the first chorus, during the final chorus, at the beginning, at the end, etc.), and/or a minimum, recommended, or maximum number of times an audio message 194 is to be played during the audio track (once, twice, five times, unlimited, etc.).

In an example, a message provider module 170, 170A, 170N selects a message 194 from a plurality of available messages 194 associated with the keyword 192. For example, a message provider module 170, 170A, 170N may select a message 194 from multiple messages 192 provided by a single message communicator 190 or different message communicators 190. In one example, a message provider module 170, 170A, 170N selects a message 194 for a keyword 192 sought by different message communicators 190 based on keyword 192 bids offered by message communicators 190, based on predetermined priority of the message communicators 190 (e.g., according to a service level agreement, a contractual obligation, a partnership, etc.), or based on a priority assigned to a message 194 by a message communicator 190 (e.g., urgent, emergency, high, etc.). In one example, a message provider module 170, 170A, 170N may alternate or rotate delivery of message communicator 190 messages 194 across one or more instances of use and/or different users.

In an example, a message provider module 170, 170A, 170N determines whether to provide a message 194 to a user. For example, a message provider module 170, 170A, 170 may determine whether or not to provide a message 194 to a user based on one or more of indicated user preferences, detected user preferences, user feedback, indicated user needs, detected user needs, a previous location of the user, a current location of the user, a next location of the user, a live or virtual event attended by the user, and/or a current or detected activity of the user.

In an example, a message provider module 170, 170A, 170N provides a message 194 to a user based on a location of the user. For example, a message provider module 170, 170A, 170N associated with a merchant, retailer, or other business may send certain content or messages 194 (e.g., promotions, incentives, etc.) to a user detected or present at a location (e.g., store, kiosk, etc.). In one example, a message provider module 170, 170A, 170N provides a message 194 relating to a specific message communicator 190 (e.g., merchant, retailer, etc.) when a user is detected (e.g., detected on network 104 such as a WiFi or beacon network 104) or reports at a location of the message communicator 190.

In some examples, a beacon network 104 or positioning information may indicate a particular aisle, floor, region, department, or other area where a user is located when the user is at or within a location of a message communicator 190. In such examples, a message provider module 170, 170A, 170N may provide certain content or messages relating to specific products or services available at or near a particular location (e.g., aisle, floor, region, department, etc.) within the location of a message communicator 190. For example, a user detected in a television department of an electronics retailer may receive messages 194 relating to televisions instead of laptops, vacuums, other devices sold by the electronics retailer.

Figure 2:
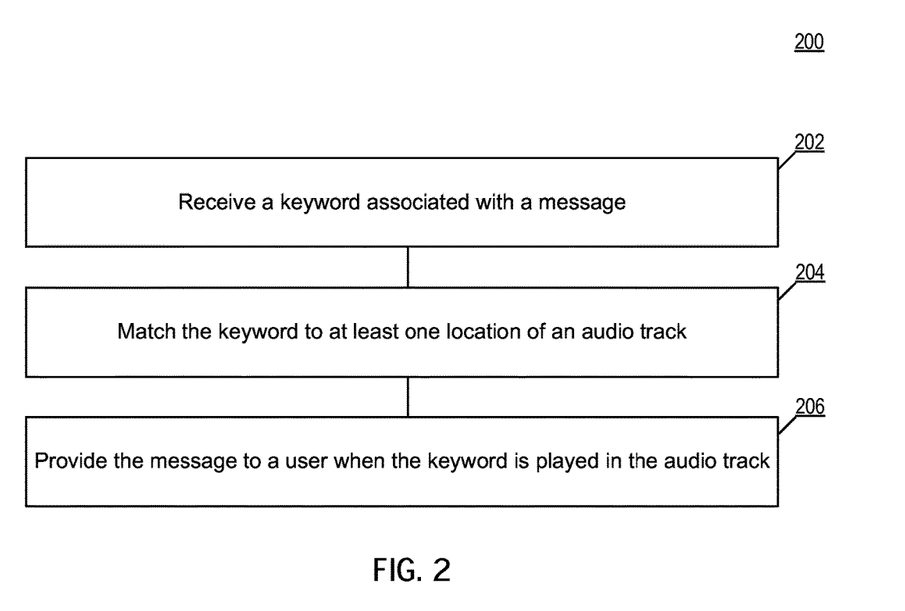
FIG. 2 is a flow diagram for providing audible proximity messaging, according to an example of the present disclosure.

FIG. 2 is a flow diagram for providing audible proximity messaging, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 200 are described with respect to audible messaging system 130 for the sake of consistency and also generally apply to various other audible messaging system 130A, 130N examples discussed herein.

Method 200 begins at block 202 when request processor module 140 of audible messaging system 130 receives a keyword 192 associated with a message 194. In an example, request processor model 140 receives one or more keywords 192 from a message communicator 190 seeking to communicate with a user. For example, a message communicator 190 may wish to inform a user about a promotion, offer, event, situation, or alert relating to the location or interests of the user. In an example, request processor module 140 receives one or more keywords 192 from message communicator 190 to locate in one or more audio tracks and/or other types of content.

In an example, request processor module 140 receives one or more keywords 192 and one or more messages 194 to be used in relation to the keywords 192 from a message communicator 190 together at the same time. Request processor module 140 also may receive keywords 192 and associated messages 194 at different times. For example, keywords 192 may be received first to perform keyword 192 matching on audio tracks. Associated messages 194 then may be received later, for example, when a message 194 is available, when a specific message 194 is determined for a user, or when a message 194 is substituted with a new or different version. Request processor module 140 may receive keywords 192 and messages 194 from message communicators 190 over any of one or more network(s) 104, including beacon networks, Wi-Fi networks, or any other types of networks 104.

At block 204, audio analyzer module 150 of audible messaging system 130 matches the keyword 192 to at least one portion of an audio track. In an example, audio analyzer module 150 analyzes one or more tracks of audio content 108 to identify keywords 192 used in the audio content 108. For example, audio analyzer module 150 may search for a keyword 192 match in the audio content 108 based on one or more of an exact match, a similar word search, a fuzzy search, a wild card search, a Soundex query, a phonetic comparison, a related word, a synonymous word, etc.

In an example, audio analyzer module 150 analyzes audio content 108 data and metadata to identify one or more instances of a keyword 192 matches in the audio content 108. Audio analyzer module 150 may analyze a stored audio track, for example, before or when the stored audio track is played. Audio analyzer module 150 also may analyze an audio track streamed over a network 104, for example, before or during transmission of a streamed audio track.

In an example, audio analyzer module 150 identifies one or more locations where a keyword 192 match occurs in an audio track for a keyword 192. For example, audio analyzer module 150 may identify timing of one or more locations within an audio track where a keyword 192 match occurs in an audio track. In some examples, audio analyzer module 150 may insert a metadata placeholder into an audio track or associate metadata with an audio track, the metadata comprising information about one or more keyword 192 matches occurring at a particular location or throughout an audio track.

At block 206, message provider module 170 of audible messaging system 130 provides the message 194 to a user when the matching keyword 192 is played in the audio track. In an example, message provider module 170 provides an audible message 194 associated with a keyword 192 match in an audio track to a client machine 102A or a client audio device 102N of a user. In some examples, an audible message provider module 170 may send an audible message to a user's smartphone, smart headphones, smart earbuds, or other type of computing device. Further, message provider module 170 may provide one or more messages 194 to a user in various forms including, but not limited to, audio messages, textual messages, multimedia messages, instant messages, push notifications, etc.

In an example, message provider module 170 sends one or more messages 194 from a message communicator 190 seeking to communicate with a user when a keyword 192 match occurs in an audio track played by the user. For example, a message provider module 170 may blend an audio message 194 with content of an audio track at a location of a keyword 192 match or replace a portion of an audio track with the audio message 194 at the location of the keyword 192 match.

In an example, message provider module 170 determines whether to provide a message 194 to a user. For example, message provider module 170 may provide a message communicator 190 message 194 to a user at a location of a keyword 192 match in an audio track played by the user based on one or more of user preferences, user feedback, user needs, location of a user, based on a live or virtual event or venue attended by the user, and/or based on an activity of a user.

In an example, a user may create and maintain one or more user profiles or preference settings that indicate information about a user's desire to receive audio messages 194 from message communicators 190. For example, a user may have work, home, driving, exercising, shopping, sleeping, do not disturb, or other user profiles or preference settings.

In one example, the user may indicate in work, exercising, sleeping, and do not disturb profiles or preference settings that the user does not wish to hear message communicator 190 messages 194. Thus, message provider module 170 may filter or suppress message communicator 190 messages 194 based on one or more user profiles or preference settings. On the other hand, a user may indicate a desire to hear message communicator 190 messages 194 at home or when shopping, and message provider module 170 then passes such messages 194 along to the user accordingly.

In an example, message provider module 170 may match one or more possible message communicator 190 messages 194 to a user based on interest of the user indicated in a user profile. For example, message provider module 170 may determine a message 194 associated with an athletic event or athletic apparel is of importance or relevance to a user that has indicated an interest in sports, indicated an interest in athletic apparel, participates in sports, or is present at a virtual or physical sports-related venue.

In an example, message provider module 170 may match one or more possible message communicator 190 messages 194 to a user based on one or more indicated or detected needs of a user. For example, a user may indicate the need or desire to buy a new pair of shoes. Message provider module 170 also may determine a user is in need of a new pair of running shoes based on information shared by a running application, a personal fitness tracker, a smart watch, or other information source. Message provider module 170 also may make a similar determination, for example, by determining a user is in need of a tire rotation, new automobile tires, an oil change, or scheduled automobile maintenance based on the number of detected or reported miles that a user has driven.

Figure 3:
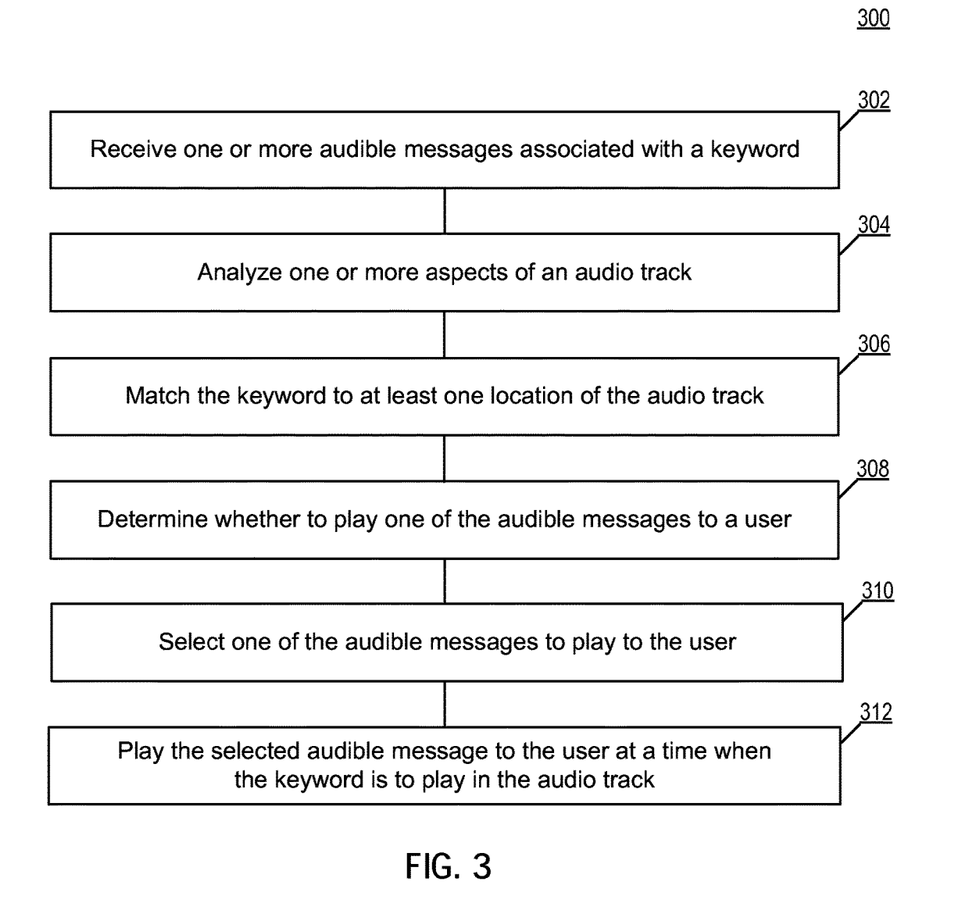
FIG. 3 is a flow diagram for providing audible proximity messaging during one or more locations of an audio track, according to an example of the present disclosure.

FIG. 3 is a flow diagram for providing audible proximity messaging during one or more locations of an audio track, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. Examples in the method 300 are described with respect to audible messaging system 130 for the sake of consistency and also apply to various other audible messaging system 130A, 130N examples discussed herein.

Method 300 begins at block 302 when request processor module 140 of audible messaging system 130 receives one or more audible messages 194 associated with a keyword. In an example, request processor model 140 receives one or more keywords 192 from a message communicator 190 seeking to provide a message 194 to a user. In one example, request processor module 140 receives one or more keywords 192 and one or more messages 194 from a message communicator 190 at the same time, or at different times. Request processor module 140 may receive keywords 192 and messages 194 from message communicators 190 over any of one or more network(s) 104, including beacon networks, Wi-Fi networks, or other types of networks 104. In some examples, request processor module 140 receives keywords 192 and messages 194 from a merchant seeking to communicate with one or more users at a shopping location.

At block 304, audio analyzer module 150 of audible messaging system 130 analyzes one or more aspects of an audio track. In an example, audio analyzer module 150 searches one or more audio tracks to identify keywords 192 or keyword 192 matches within audio tracks. In an example, audio analyzer module determines whether one or more keywords 192 exist in an audio track by examining one or more aspects of the audio track. For example, audio analyzer module 150 may analyze data or metadata associated with an audio track to identify one or more instances of keyword 192 in the audio track. In some examples, keywords 192 may be provided by a merchant seeking to offer one or more products, services, promotions, advertisements, coupons, or other information to a user via an audible message 194 played to the user at an occurrence of a keyword 192 during an audio track.

At block 306, audio analyzer module 150 of audible messaging system 130 matches the keyword 192 to at least one location of the audio track. In an example, audio analyzer module 150 matches a merchant-supplied keyword 192 to text, sound, imagery, data or metadata associated with one or more different types of content based on an exact match, a similar word search, a fuzzy search, a wild card search, a Soundex query, a phonetic comparison, a related word, a synonymous word, sound recognition, speech recognition, image recognition, etc.

In an example, audio analyzer module 150 identifies one or more locations or points within an audio track where keyword 192 matches are found. For example, audio analyzer module 150 may identify timing of locations of keyword 192 matches in an audio track. In some examples, audio analyzer module 150 records timing and other information associated with keyword 192 matches in an audio track, for example, in a timing index of keywords 192 in an audio track to provide efficient future reference and utilization of such information (e.g., in real-time or near real-time).

At block 308, message provider module 170 of audible messaging system 130 determines whether to play one of the audible messages to a user. In an example, message provider module 170 determines whether to play in audible message 194 to a user based on one or more of user preferences, user feedback, user needs, user location, presence of a user at a live or virtual event, and/or based on an activity of a user. In one example, message provider 170 determines to play an audible message 194 from a merchant to a user at a location of the keyword 192 match in an audio track played by the user. For example, message provider 170 may play an audible message 194 to a user when the user is detected at a merchant location or on a wireless network 104 of a merchant, and the user is accepting audible messages 194 based on current user profile and preference settings.

At block 310, message provider module 170 of audible messaging system 130 selects one of the audible messages 194 to play to the user. In an example, message provider module 170 analyzes one or more available audible messages 194 to play to a user during an audio track. For example, message provider module 170 may analyze one or more available audible messages 194 for the same keyword 192 or for different keywords 192 in an audio track. In one example, message provider module 170 selects one or more audible messages 194 to play to user based on user interests, user location, user needs, or current user activity. In some examples, message provider module 170 selects between one or more audible messages 194 based on a monetary bid offered by one or more message communicators to provide an audible message 194 to a user.

At block 312, message provider module 170 of audible messaging system 130 plays the selected audible message to the user at a time when the keyword is to play the audio track. In an example, message provider module 170 inserts one or more audio messages 194 at various locations in an audio track where a related keyword 192 match occurs. For example, message provider module 170 may substitute a portion of the audio track with an audio message 194 at the time of a related keyword 192 match in an audio track. Message provider 170 also may perform a blending of both the associated audio message 194 and an original audio track (e.g., audio blending, mixing, overlaying, etc.) at the time of a related keyword 192 match in the audio track, for example, based on a message communicator 190 or user preference. In one example, message converter module 160 converts a textual content to an audible message 194 that message provider 170 plays to the user.

Figure 4:
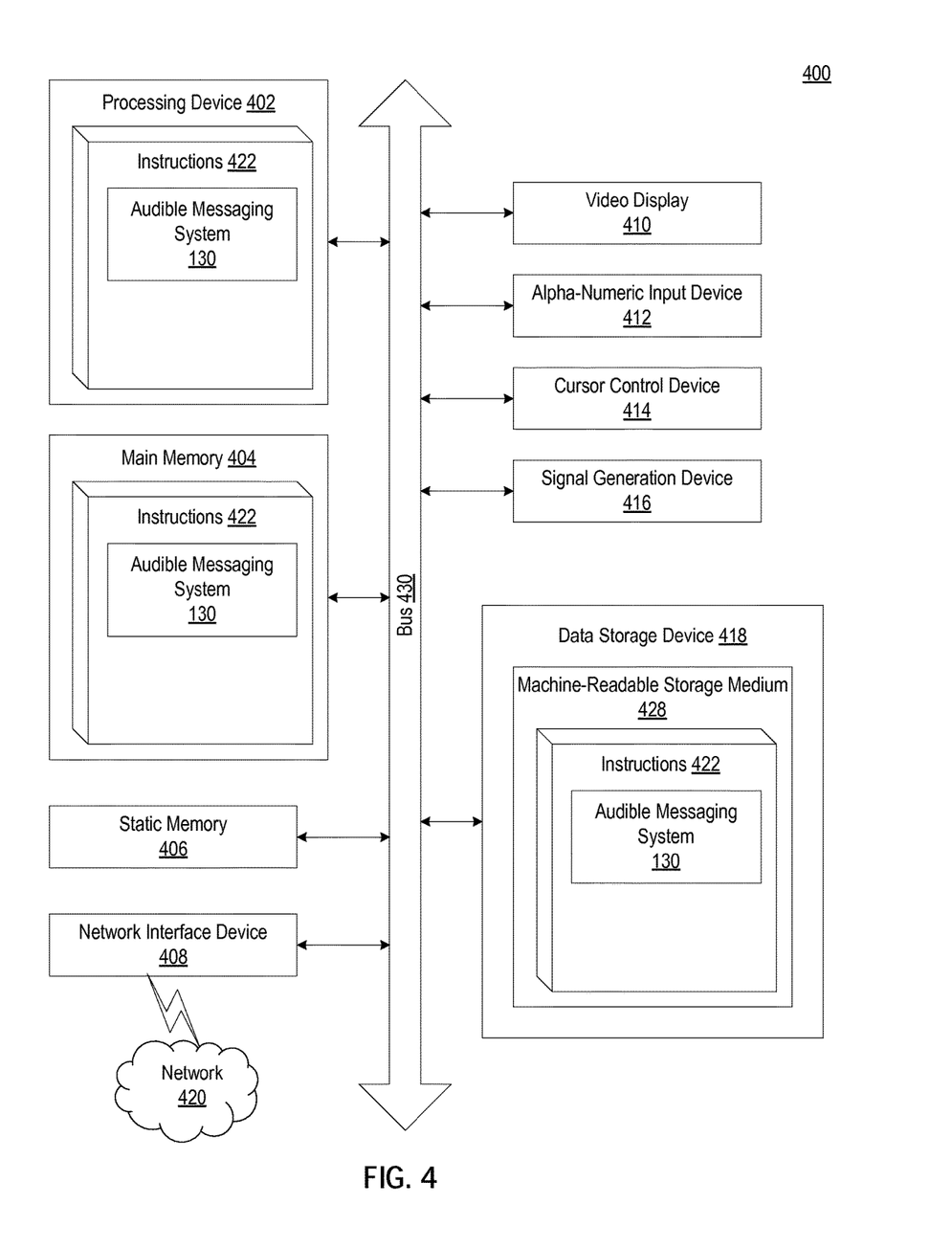
FIG. 4 is a block diagram of an exemplary computer system that may perform one or more of the operations described herein.

FIG. 4 illustrates a diagram of a machine in the exemplary form of a computer system 400, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 also may be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 also may include a network interface device 408. The computer system 400 may further include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software computer instructions) embodying any one or more of the methodologies or functions described herein. The instructions 422 also may reside, completely or at least partially, within the main memory 404 and/or within the processor 402 during execution thereof by the computer system 400, the main memory 404 and the processor 402 also constituting computer-readable storage media. The instructions 422 may be transmitted or received over a network 420 via the network interface device 408.

In one example, the instructions 422 include instructions for one or more modules of an audible messaging system (e.g., audible messaging system 130 of FIG. 1) and/or a software library containing methods that call an audible messaging system. While the computer-readable storage medium 428 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "associating", "applying", "transmitting", "receiving, " "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A system, comprising:
   a non-transitory memory; and
   one or more hardware processors coupled to the non-transitory memory and configured to read instructions from the non-transitory memory to cause the system to perform operations comprising:
   associating each of a plurality of textual keywords with an audible message that is to be provided to one or more users;
   identifying one or more locations of a textual keyword from the plurality of textual keywords in an existing audio track;
   inserting metadata into the existing audio track, the metadata indicating a number of instances and the one or more locations that the textual keyword appears in the existing audio track;
   determining, based on a user location received from a user device of a user, that the user is within a range of a physical location associated with the audible message;
   generating, dynamically in response to the determining, a modified version of the existing audio track by modifying the existing audio track using the audible message based on the inserted metadata, the modified version of the audio track comprising the audible message being inserted at a temporal location of the existing audio track for playback based on the number of instances and the one or more locations that the textual keyword appears in the existing audio track; and
   causing the user device to play the modified version of the existing audio track while the user is within the range of the physical location.

2. The system of claim 1, wherein the audible message is associated with a plurality of physical locations.

3. The system of claim 1, wherein the location of the user is further determined based on an indication of an interaction between the user device and a network device associated with the physical location.

4. The system of claim 1, wherein modifying the existing audio track is further based on a depleted resource of the user.

5. The system of claim 1, wherein identifying the one or more locations is based on analyzing text content associated with the existing audio track.

6. The system of claim 1, wherein identifying the one or more locations is based on analyzing audio content of the existing audio track.

7. The system of claim 1, wherein the audible message is converted into an audible format from a textual format.

8. The system of claim 1, wherein modifying the existing audio track comprises blending the audible message with sound of the existing audio track based on the number of instances and the one or more locations that the textual keyword appears in the existing audio track.

9. The system of claim 1, wherein modifying the existing audio track comprises replacing at least a portion of sound of the existing audio track with the audible message based on the number of instances and the one or more locations that the textual keyword appears in the existing audio track.

10. The system of claim 1, wherein modifying the existing audio track is further based on a detected activity of the user.

11. The system of claim 1, wherein the operations further comprise selecting the audible message from among a plurality of audible messages associated with the textual keyword.

12. The system of claim 1, wherein the operations further comprise selecting the audible message from among a plurality of audible messages associated with the physical location.

13. The system of claim 1, wherein modifying the existing audio track is performed while the audio track is being streamed to the user device.

14. The system of claim 1, wherein the generating is further based on a determined interest of the user.

15. A method comprising:
   detecting, by one or more hardware processors, a textual keyword associated with an audible message in an existing audio track;
   in response to detecting the textual keyword, determining, by the one or more hardware processors, a relationship between the textual keyword and the existing audio track, the relationship representing a number of instances and one or more locations that the textual keyword appears in the existing audio track;
   determining, by the one or more hardware processors, to present the audible message to a user, at least in part, based on one or more preferences of the user, and based on determining that a location of a client device of the user is within a range of a physical location associated with the audible message;
   generating, by the one or more of the hardware processors, dynamically in response to the determining, a modified version of the existing audio track by modifying the existing audio track based on the determined relationship, the audible message being incorporated into a temporal location of the existing audio track for playback based on the number of instances and the one or more locations that the textual keyword appears in the existing audio track; and
   causing, by one or more of the hardware processors, the client device to play the modified version of the existing audio track while the user is within the range of the physical location.

16. A non-transitory machine-readable medium having stored thereon machine-readable instructions executable to cause a machine to perform operations comprising:
   determining, based on a detected location of a user device of a user, that the user device is in range of a physical location associated with an audible message;
   detecting a presence of a textual keyword associated with the audible message in an existing audio track;
   determining a relationship between the textual keyword and the existing audio track, the relationship representing a number of instances and one or more locations that the textual keyword appears in the existing audio track;
   generating a modified version of the existing audio track, at least in part, based on the determined relationship between the textual keyword and the existing audio track, the modified version of the existing audio track providing presentation of the audible message incorporated at a temporal location of the existing audio track based on the number of instances and the one or more locations that the textual keyword appears in the existing audio track; and causing the user device to play the modified version of the existing audio track while the user is within the range of the physical location.

17. The non-transitory machine-readable medium of claim 16, wherein the existing audio track is associated with the user.

18. The non-transitory computer-readable medium of claim 16, wherein the audible message is associated with a plurality of physical locations of a third-party.

19. The non-transitory computer-readable medium of claim 16, wherein the audible message is selected from a plurality of audible messages associated with the physical location.

20. The non-transitory computer-readable medium of claim 16, wherein the relationship comprises a timing index of the textual keyword in the existing audio track.

* * * * *